United States Patent
Chang et al.

(10) Patent No.: US 10,157,114 B2
(45) Date of Patent: *Dec. 18, 2018

(54) SYSTEMS FOR TESTING A COMPUTER KEYBOARD

(71) Applicant: Google LLC, Mountain View, CA (US)

(72) Inventors: Yuan-Jen Chang, Taipei (TW); Chia Hang Yeh, Taipei (TW)

(73) Assignee: Google LLC, Mountain View, CA (US)

( * ) Notice: Subject to any disclaimer, the term of this patent is extended or adjusted under 35 U.S.C. 154(b) by 304 days.

This patent is subject to a terminal disclaimer.

(21) Appl. No.: 15/204,574

(22) Filed: Jul. 7, 2016

(65) Prior Publication Data

US 2016/0320268 A1 Nov. 3, 2016

Related U.S. Application Data

(63) Continuation of application No. 14/283,822, filed on May 21, 2014, now Pat. No. 9,417,980.

(51) Int. Cl.
*G06F 11/273* (2006.01)
*G06F 11/22* (2006.01)
*G01M 99/00* (2011.01)

(52) U.S. Cl.
CPC ...... *G06F 11/2733* (2013.01); *G06F 11/2221* (2013.01); *G01M 99/008* (2013.01)

(58) Field of Classification Search
CPC ..... G01F 11/00; G01F 11/273; G01F 11/2733
USPC ............................................. 73/865.3, 865.9
See application file for complete search history.

(56) References Cited

U.S. PATENT DOCUMENTS

| 4,682,695 | A | * | 7/1987 | Hasenbalg | B07C 5/344 198/346.2 |
| 5,192,152 | A | * | 3/1993 | Silvestri | B41J 29/00 400/180 |
| 6,304,830 | B1 | * | 10/2001 | Lee | G01M 99/008 340/301 |
| 6,648,531 | B1 | * | 11/2003 | Goldberg | G06F 3/0202 400/473 |
| 7,798,013 | B2 | | 9/2010 | Chiu et al. | |
| 8,099,253 | B1 | * | 1/2012 | Rau | G01M 99/008 400/473 |
| 8,256,266 | B2 | | 9/2012 | Qiu et al. | |
| 2014/0283629 | A1 | * | 9/2014 | Chu | G06F 11/2221 73/865.3 |

(Continued)

*Primary Examiner* — Peter Macchiarolo
*Assistant Examiner* — Nathaniel Kolb
(74) *Attorney, Agent, or Firm* — Byrne Poh LLP (57) ABSTRACT

Systems for testing a computer keyboard are provided. In some implementations, the system comprises: a plurality of elongate members, each having a first end and a second end; a support structure having a first surface, a second surface, and a plurality of apertures that pass through the support structure from the first surface to the second surface such that the plurality of apertures corresponds to a layout of keys of a computer keyboard, wherein a longitudinal axis of each of the plurality of elongate members is aligned with the plurality of apertures; and a roller that moves under a subset of apertures during operation of the system and contacts the elongate member thereby causing the elongate member to be displaced by at least a first amount such that the second end of the elongate member protrudes at least a second amount from the surface of the support structure.

20 Claims, 8 Drawing Sheets

(56) References Cited

U.S. PATENT DOCUMENTS

2014/0305231 A1* 10/2014 Chu .................... G01M 99/007
                                                                    73/865.3
2014/0345395 A1* 11/2014 Wang ................... G06F 11/26
                                                                    73/863.01

* cited by examiner

FIG. 8 ns of the
SYSTEMS FOR TESTING A COMPUTER KEYBOARD

CROSS-REFERENCE TO RELATED APPLICATION

This application is a continuation of U.S. patent application Ser. No. 14/283,822, filed May 21, 2014, which is hereby incorporated by reference herein in its entirety.

TECHNICAL FIELD

The disclosed subject matter relates to systems for testing a computer keyboard.

BACKGROUND

Users can become frustrated when one or more keys of a computer keyboard malfunction, for example, by not detecting a keypress. Malfunctioning computer keyboards are particularly problematic on laptops because it can be difficult to replace just the keyboard if it is malfunctioning. Therefore, it can be important to test computer keyboards before they are used by users, for example, at a factory where the keyboard is manufactured and/or assembled. However, it can be difficult to quickly and efficiently test the keys of a computer keyboard. For example, computer keyboards are sometimes tested using an individual solenoid valve to trigger each key, which can be expensive and difficult to maintain since the system relies on electronics to control all of the solenoid valves.

Accordingly, it is desirable to provide new systems for testing a computer keyboard.

SUMMARY

Systems for testing a computer keyboard are provided. In accordance with some implementations of the disclosed subject matter, systems for testing a computer keyboard are provided, the systems comprising: a plurality of elongate members, each having a first end and a second end; a support structure having a first surface, a second surface, and a plurality of apertures that pass through the support structure from the first surface to the second surface such that an arrangement of the plurality of apertures substantially corresponds to a layout of a plurality of keys of a computer keyboard, wherein a longitudinal axis of each of the plurality of elongate members is aligned with a corresponding one of the plurality of apertures; and a roller that moves under a subset of apertures of the plurality of apertures during operation of the system and that contacts an elongate member aligned with each of the subset of apertures, thereby causing the elongate member to be displaced by at least a first amount that is based on the dimensions of the roller such that the second end of the elongate member protrudes at least a second amount from the second surface of the support structure.

In accordance with some implementations of the disclosed subject matter, a system for testing a keyboard is provided, the system comprising: a plurality of contacting means, each having a first end and a second end; guiding means having a first surface, a second surface, and a plurality of arranging means that pass through the guiding means from the first surface to the second surface such that an arrangement of the arranging means substantially corresponds to a layout of a plurality of keys of a computer keyboard, wherein a longitudinal axis of each of the plurality of contacting means is aligned with a corresponding one of the plurality of arranging means; and displacing means that move under a subset of the plurality of arranging means during operation of the system and contact the contacting means aligned with each of the subset of arranging means, thereby causing the contacting means to be displaced by at least a first amount that is based on the dimensions of the displacing means such that the second end of the contacting means protrudes at least a second amount from the surface of the guiding means.

In some implementations, a bias is applied to the contacting means by gravity, and the displacing means overcomes the gravitational bias to displace the contacting means by the first amount during operation of the system.

In some implementations, a bias is applied to the contacting means by a plurality of springs that correspond to the contacting means, and the displacing means overcomes the bias provided by the springs to displace the contacting means by the first amount during operation of the system.

In some implementations, the system further comprises: supporting means, wherein the supporting means provides a surface along which the displacing means is configured to roll during operation.

In some implementations, the system further comprises moving means for causing the displacing means to roll along the supporting means.

In some implementations, a distance between the supporting means and the first end of the plurality of contacting means is adjustable, thereby effecting a change in the second amount by which the second end protrudes.

In some implementations, a cross-sectional area of the contacting means is larger than an area of the corresponding arranging means at a point between the first end and the second end.

In some implementations, the system further comprises: housing means for supporting the displacing means in a default position; moving means for causing the displacing means to move laterally in a direction corresponding to the contacting means; rotating means for causing the moving means to move by rotating and engaging with the moving means; and driving means for causing the rotating means to rotate during operation of the system, thereby causing the moving means to move the housing means to contact a subset of the contacting means.

In some implementations, the moving means comprises a first platform and a second platform, wherein the first platform is coupled to the displacing means and the second platform is coupled to second displacing means.

In some implementations, the system further comprises linear distance control means for controlling a distance between the displacing means and the first end of the plurality of contacting means.

In some implementations, the system further comprises second linear distance control means for controlling the distance between the second displacing means and the first end of the plurality of contacting means, wherein the linear distance control means causes the distance between the displacing means and the first end of the plurality of contacting means to be reduced during lateral movement of the moving means in a first direction, wherein the second linear distance control means causes the distance between the second displacing means and the first end of the plurality of contacting means to be reduced during lateral movement of the moving means in a second direction, and wherein the lifting means causes the distance between the displacing means and the first end of the plurality of contacting means to be increased during lateral movement of the moving means in the second direction.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various implementations, mechanisms for testing a computer keyboard are provided.

In some implementations, the mechanisms described herein can facilitate testing of a computer keyboard by causing one or more pins to contact one or more keys of the computer keyboard. In some implementations, the one or more pins can be arranged in a two-dimensional pattern. In some implementations, a pin can be displaced toward the keys of the computer keyboard when a roller contacts the pin.

In some implementations, the mechanisms described herein can cause the roller to move automatically utilizing a motor. For example, in some implementations, the motor can be coupled to a pulley, where the motor can cause the pulley to move and/or rotate. The movement and/or rotation of the pulley can, in turn, cause a belt that is operatively coupled to the pulley to move in a direction dictated by the movement of the pulley. In some implementations, a carriage that houses one or more rollers can be coupled to the belt, and movement of the belt can cause the carriage housing the one or more rollers to move along a predetermined path along the two-dimensional pattern in which the one or more pins are arranged.

In some implementations, the mechanisms described herein can determine and/or record which keys of the keyboard, when contacted by the one or more pins, successfully generated a signal indicating that the key was pressed. For example, in some implementations, a computer keyboard being tested can be connected to a computer, and the mechanisms can determine which keypresses were registered by the computer during testing. In some implementations, the computer can be a special purpose computer or a general purpose computer. For example, in some implementations, a computer keyboard can be connected to a general purpose computer (e.g., a laptop computer, a desktop computer, and/or any other suitable type of general purpose computer), which can be used to determine which keypresses were registered. As another example, in some implementations, a computer keyboard can be connected to a special purpose computer that is used solely to test computer keyboards.

Figure 1:
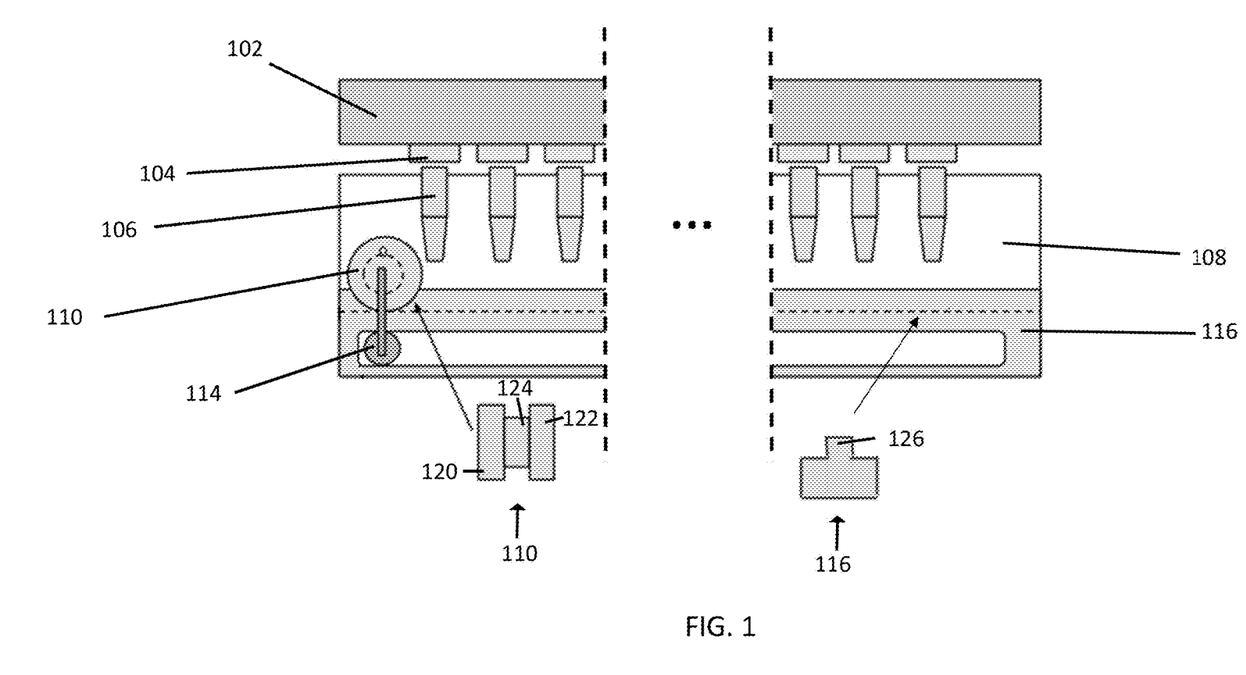
FIG. 1 shows an example of a system for testing a computer keyboard where the keyboard is placed facing downwards in accordance with some implementations of the disclosed subject matter.

Turning to FIG. 1, an example 100 of a system for testing a computer keyboard is shown in accordance with some implementations of the disclosed subject matter. As illustrated, in some implementations, system 100 can include one or more pins (e.g., pin 106), a support structure 108, a roller 110, and a support bar 116.

As shown in FIG. 1, a computer keyboard 102 can be placed in an orientation such that the keys of computer keyboard 102 (e.g., key 104) are placed facing one or more pins (e.g., pin 106) of system 100. Whether key 104 is operative can be determined based on whether contacting key 104 with pin 106 causes the press of key 104 to be registered (e.g., by producing an electrical signal corresponding to a character and/or function associated with key 104). In some implementations, any suitable computer keyboard can be used having any suitable layout (e.g., a QWERTY layout, a Dvorak layout, and/or any other suitable keyboard layout). Additionally or alternatively, in some implementations, a computer keyboard can be a special purpose computer keyboard (e.g., an ergonomically designed computer keyboard, and/or any other suitable type of computer keyboard). In some implementations, a computer keyboard can be a portion of a laptop computer that includes the computer keyboard. Furthermore, in some implementations, any other suitable type of keyboard can be tested (e.g., a cash register keyboard, an electronic piano keyboard, and/or any other suitable type of keyboard).

The one or more pins can be arranged in any suitable arrangement. For example, in some implementations, the one or more pins can be arranged in a two-dimensional pattern, with any suitable layout. For example, in some implementations, the pattern can include a number of rows of pins corresponding to rows on computer keyboard 102. As another example, in some implementations, a row in the pattern can include a number of pins corresponding to a number of keys within a particular row of computer keyboard 102. Note that, in some implementations, a row of pins can be straight or curved, for example, to correspond to a layout of a computer keyboard to be tested.

Pin 106 can be any suitable elongate member that can be used to contact key 104 of computer keyboard 102. In some implementations, pin 106 can be made of any suitable material (e.g., metal, acrylic, plastic, rubber, and/or any other suitable material). Additionally, in some implementations, pin 106 can include a tip (not shown) made of any suitable material (e.g., rubber, paper, plastic, fabric, and/or any other suitable material). The tip can contact key 104, thereby reducing the chance that pin 106 damages key 104.

In some implementations, support structure 108 can house the one or more pins. In some implementations, support structure 108 can have one or more holes or apertures. Each pin, such as pin 106 shown in FIG. 1, can be oriented such that, during operation, the pin protrudes through a corresponding aperture of support structure 108 to contact a key of computer keyboard 102, such as key 104. In some implementations, pin 106 can be prevented from falling through an aperture of support structure 108 in any suitable manner. For example, in some implementations, pin 106 can include one or more flanges (not shown). In such implementations, the flange can prevent the pin from falling below the default position. As another example, in some implementations, a cross-sectional area of a portion of pin 106 can be larger than a cross-sectional area of a corresponding aperture of support structure 108. In such implementations, the portion of pin 106 having a cross-sectional area larger than the area of the corresponding aperture can thereby inhibit pin 106 from falling completely through the aperture toward support bar 116. As a more particular example, in some implementations, pin 106 can have a conical shape, such that a portion of pin 106 that is farthest from an end of pin 106 that contacts a key has a greater radius than a portion of pin 106 that is nearest to an end of pin 106 that contacts a key.

In some implementations, roller 110 can roll under the apertures of support structure 108 when the system is in operation. In some implementations, roller 110 can contact and/or engage with pin 106 as is moves laterally causing pin 106 to be displaced such that pin 106 protrudes through a corresponding aperture of support structure 108 toward key 104 and contacts key 104. A cross-sectional view of roller 110 is also shown in FIG. 1 in accordance with some implementations of the disclosed subject matter. In some implementations, a magnitude of the displacement of pin 106 toward key 104 can be based on the dimensions of roller 110. For example, as shown in the cross-sectional view, roller 110 can include outer portions 120 and 122 and an inner portion 124. In such implementations, pin 106 can be displaced toward key 104 when inner portion 124 contacts a bottom portion of pin 106, thereby causing pin 106 to be displaced to a height based on the original height of pin 106 and a height of inner portion 124 of roller 110.

In some implementations, roller 110 can be configured to move along support bar 116. A cross-sectional view of support bar 116 is also shown in FIG. 1 in accordance with some implementations of the disclosed subject matter. As shown in FIG. 1, in some implementations, support bar 116 can have a protrusion 126. In some such implementations, protrusion 126 can be configured to engage with the portion of roller 110 between outer portions 120 and 122 such that roller 110 can roll along support bar 116, and be guided by protrusion 126.

Note that, in some implementations, roller 110 can be a toothed roller that can engage teeth of support bar 116 using teeth of roller 110.

In some implementations, roller 110 can be coupled to a handle 114. In some implementations, moving handle 114 (e.g., by pulling, pushing, rotating, and/or any other suitable movement) can cause roller 110 to move under the one or more apertures of support structure 108.

Figure 2:
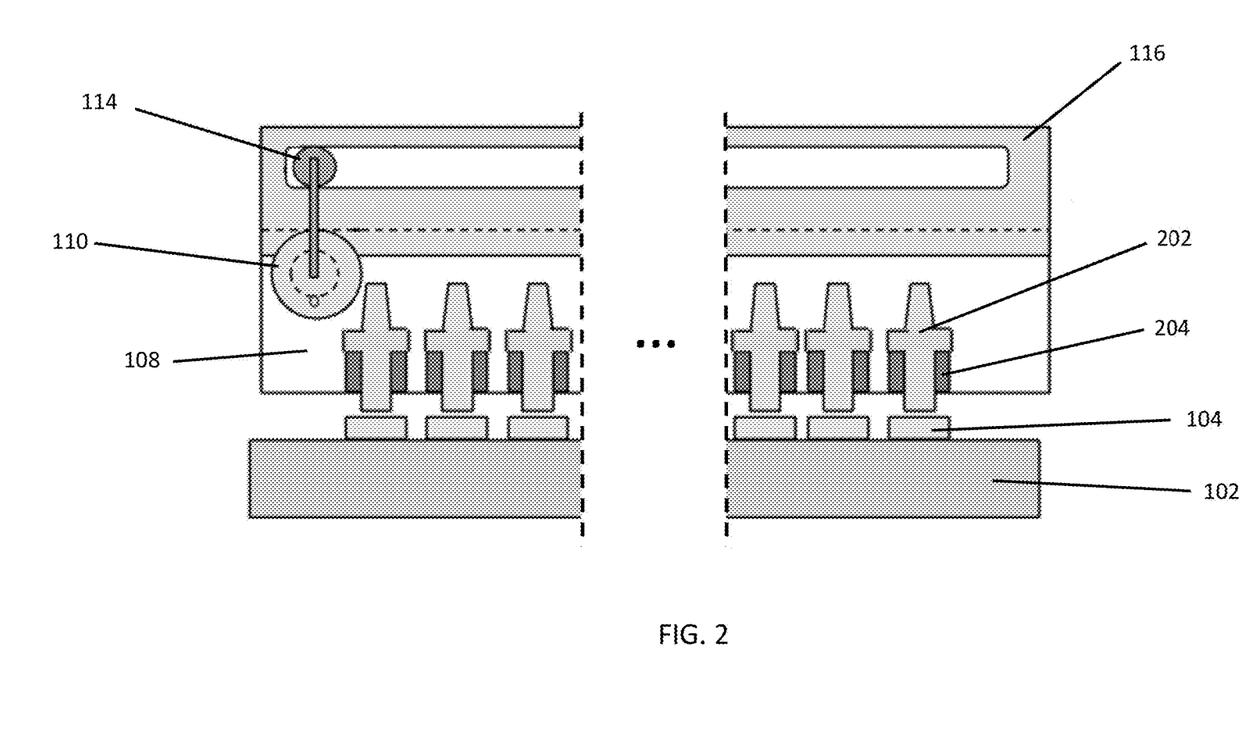
FIG. 2 shows an example of a system for testing a computer keyboard where the keyboard is placed facing upwards in accordance with some implementations of the disclosed subject matter.

As shown in FIG. 1, the pins of system 100 are biased by gravity. That is, roller 110 displaces the pins in a direction that opposes gravity, and the pins are therefore maintained at a default position by the force of gravity. FIG. 2 shows an example 200 of a system where roller 110 can displace the pins in a direction coinciding with the gravitational force. As illustrated, system 200 can include one or more pins, such as pin 202, and one or more springs corresponding to the one or more pins, such as spring 204.

As shown in FIG. 2, pin 202 can be coupled to spring 204 in any suitable manner. For example, in some implementations, pin 202 can be inserted through spring 204, and a position of the combination of pin 202 and spring 204 can be maintained through the force of gravity. As another example, in some implementations, spring 204 can be coupled to support structure 108 using any suitable fastener (e.g., e.g., a bracket, a screw, a bolt, a clip, a rivet, a nut, and/or any other suitable fastener) and/or adhesive (e.g., glue, epoxy, and/or any other suitable adhesive). As yet another example, in some implementations, spring 204 can be coupled to pin 202 using any suitable fastener (e.g., a bracket, a screw, a bolt, a clip, a rivet, a nut, and/or any other suitable fastener) and/or adhesive (e.g., glue, epoxy, and/or any other suitable adhesive). Spring 204 can provide a bias that maintains pin 202 in a default position that does not contact key 104 when roller 110 is not contacting and/or engaging pin 202. Spring 204 can be made of any suitable material (e.g., steel, aluminum, titanium, copper, plastic, and/or any other suitable material), can have any suitable dimensions, and can have any suitable spring constant.

Although not shown in FIGS. 1 and 2, in some implementations, a distance between support structure 108 and computer keyboard 102 can be maintained by one or more rubber bumpers coupled to support structure 108 (e.g., glued onto support structure 108, attached by a fastener, such as a screw or rivet, and/or using any other suitable manner of coupling). In some implementations, in instances where computer keyboard 102 is placed in a position where the keys are facing upward (as in FIG. 2), support structure 108 can be supported by an additional external support structure (not shown) coupled to a table, bench, and/or any other suitable structure. In such implementations, the additional external support structure can maintain a distance between support structure 108 and computer keyboard 102, which can be placed on the table, bench, and/or other receptacle to which the external support structure is coupled.

In some implementations, a distance between support bar 116 and the one or more pins can be increased and/or decreased. For example, in some implementations, decreasing the distance between support bar 116 and the one or more pins can cause a pin, when contacted by the roller, to be displaced and protrude by an increased distance from a corresponding aperture.

In some implementations, movement of a roller can be automated. FIGS. 3-6 show an example of a system for automatically testing a computer keyboard by using a motor to control movement of the roller.

Figure 3:
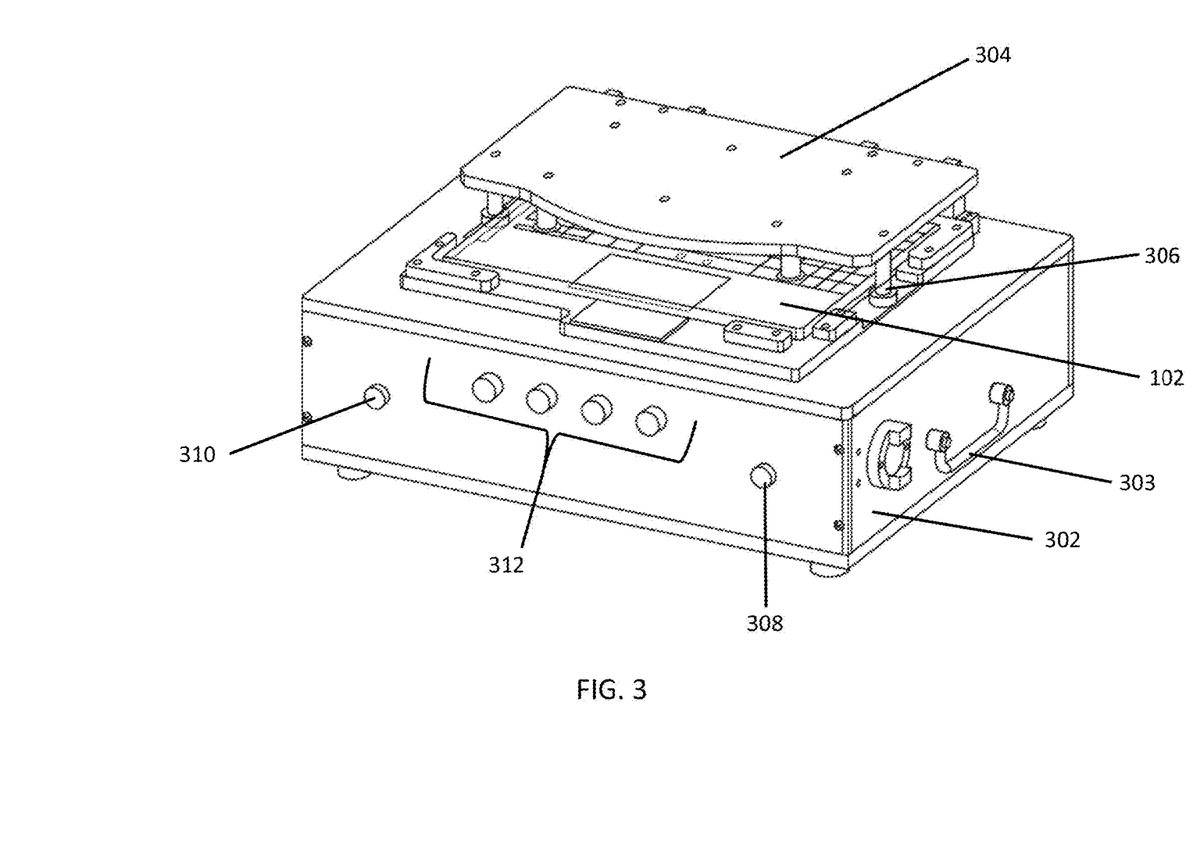
FIG. 3 shows an example of an apparatus for automated testing of a computer keyboard in accordance with some implementations of the disclosed subject matter.

FIG. 3 shows an example 300 of an apparatus for supporting a computer keyboard and controlling a motor which can cause one or more rollers to move, thereby causing one or more pins to contact keys of the computer keyboard. In some implementations, apparatus 300 can include a housing 302, a top plate 304, a lock structure 306, one or more buttons, such as start buttons 308 and 310, and one or more indicators 312.

In some implementations, housing 302 can include any suitable structure on which a computer keyboard can be placed and/or tested. Housing 302 can be made of any suitable material (e.g., metal, plastic, and/or any other suitable material) and can have any suitable dimensions. In some implementations, housing 302 can include a handle 303, as shown in FIG. 3.

In some implementations, housing 302 can include top plate 304. Top plate 304 can cover computer keyboard 102 during testing. Note that FIG. 3 shows computer keyboard 102 with a transparent opacity to illustrate an arrangement of the keys of computer keyboard 102. Top plate 304 can be made of any suitable material and can have any suitable dimensions. In some implementations, top plate 304 can be coupled to lock structure 306. In such implementations, lock structure 306 can couple to a keyboard positioning structure on housing 302. In some implementations, lock structure 306 can be secured to the keyboard positioning structure by coming in proximity to and/or contacting an electromagnet on the keyboard positioning structure, thereby allowing top plate 304 to be secured in a closed position during operation of the system.

In some implementations, apparatus 300 can include start buttons 308 and 310. Start buttons 308 and/or 310 can control a power state and/or an operational state of apparatus 300. For example, in some implementations, when actuated, start buttons 308 and/or 310 can cause apparatus 300 to be powered on and/or activated. As another example, in some implementations, start buttons 308 and/or 310 can cause a sequence for testing computer keyboard 102 to begin. This sequence can include, for example, causing a motor to cause a roller to move, thereby causing one or more pins to contact the keys of computer keyboard 102. Although two buttons are shown in apparatus 300, in some implementations, any suitable number of buttons (e.g., one, two, three, five, and/or any other suitable number) can be included, and these buttons can cause any suitable functions to be started and/or performed. For example, in some implementations, each button can cause the system to power down, pause a sequence for testing a computer keyboard, store a result of a test, and/or perform any other suitable function(s).

Indicators 312 can be used to indicate any suitable information about a function and/or a status of apparatus 300. For example, in some implementations, one of indicators 312 can indicate that a sequence for testing computer keyboard 102 is in progress. As another example, in some implementations, one of indicators 312 can indicate that an error has occurred in the sequence for testing computer keyboard 102, such as if a part of apparatus 300 (e.g., a motor, a roller, a pin, a lock structure, a top plate, and/or any other suitable part) malfunctions. In some implementations, indicators 312 can include lights (e.g., LEDs, and/or any other suitable type of lights) and/or filters that cause indicator 312 to light up as one or more suitable colors. For example, in some implementations, an indicator that emits a green-colored light can indicate one status of apparatus 300 (e.g., that apparatus 300 is ready to begin testing of computer keyboard 102), an indicator that emits a yellow-colored light can indicate a second status of apparatus 300 (e.g., that apparatus 300 is currently testing computer keyboard 102), and an indicator that emits a red-colored light can indicate an error status of apparatus 300 (e.g., that a part of apparatus 300 has malfunctioned, that a computer keyboard is not securely placed in the keyboard positioning structure, and/or any other suitable error status). Any suitable number of indicators (e.g., zero, one, two, five, and/or any other suitable number) can be included in indicators 312.

Figure 4:
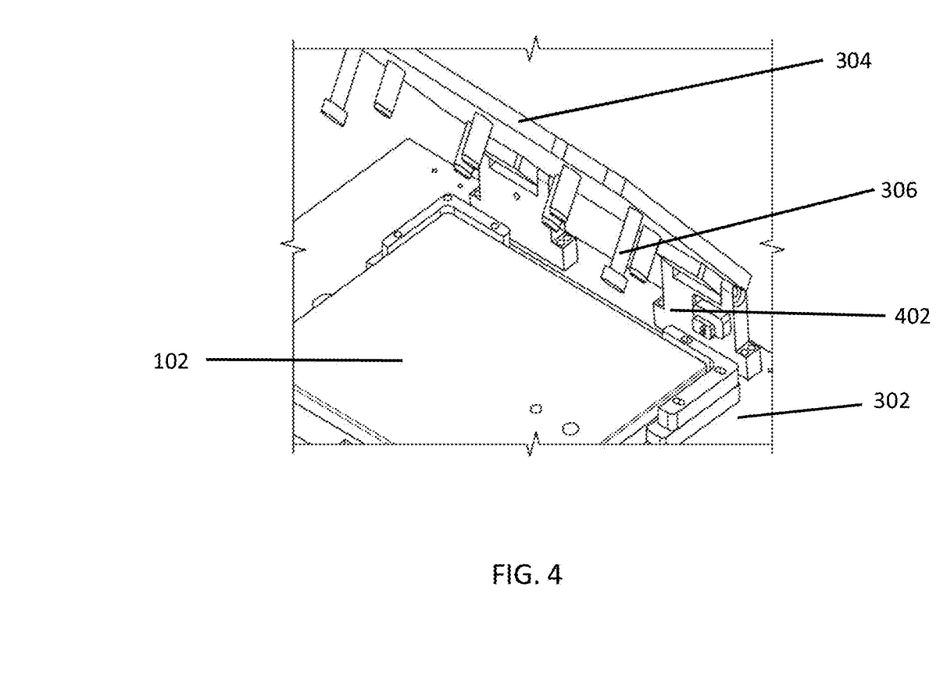
FIG. 4 shows a more detailed view of an enclosure for a computer keyboard used in the apparatus of FIG. 3 in accordance with some implementations of the disclosed subject matter.

Turning to FIG. 4, a view of top plate 304 of apparatus 300 in a raised position is shown in accordance with some implementations of the disclosed subject matter. As shown in FIG. 4, in some implementations, top plate 304 can be raised to allow a computer keyboard to be placed in a keyboard positioning structure of apparatus 300 and can be lowered before testing of the computer keyboard begins. In some implementations, top plate 304 can be coupled to a base 402. Base 402 can be coupled to one or more hinges, which can be attached to top plate 304, thereby allowing top plate 304 to be raised and lowered by rotating the hinges.

Figure 5:
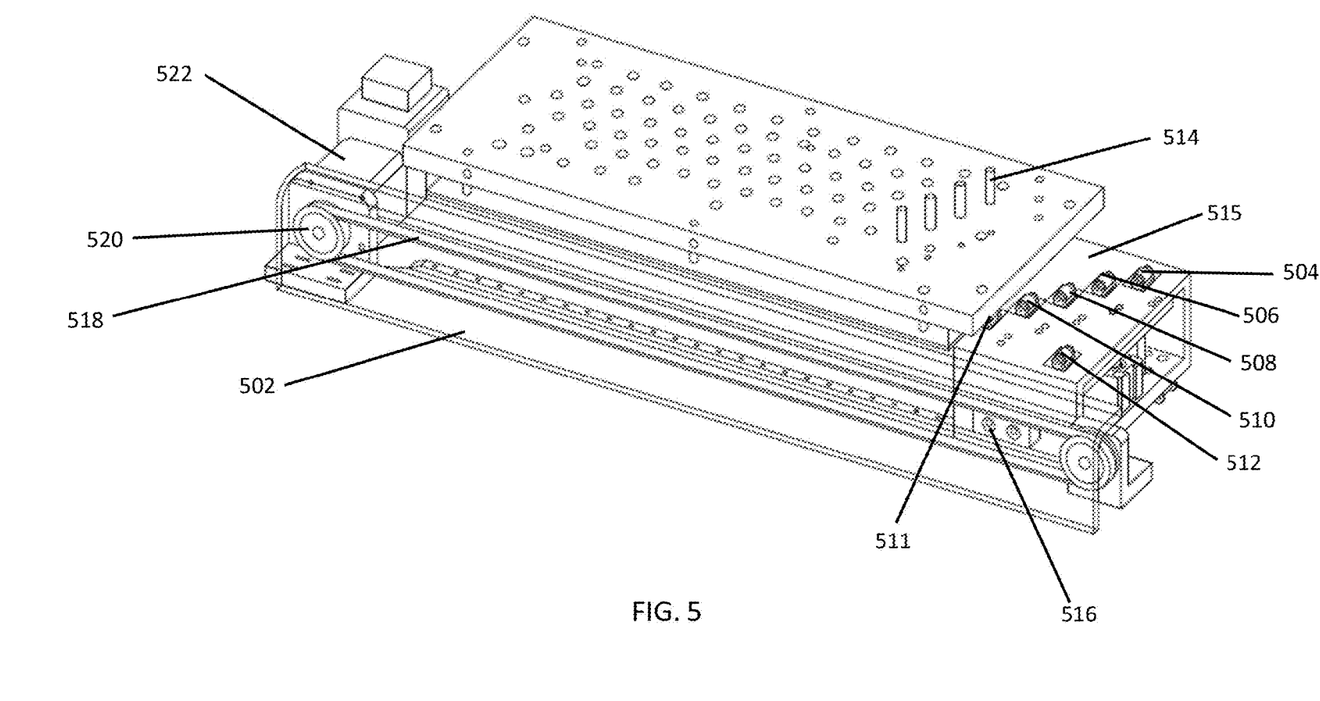
FIG. 5 shows an example of a motor, pulley, belt, and carriage that can be used for automated testing of a computer keyboard in accordance with some implementations of the disclosed subject matter.

Turning to FIG. 5, an example 500 of a system including a motor, a pulley, and a belt for moving a carriage that houses one or more rollers that cause one or more pins to be displaced towards keys of a computer keyboard that can be used in apparatus 300 of FIG. 3 is shown in accordance with some implementations of the disclosed subject matter. As illustrated, system 500 can include a cover 502, one or more rollers, such as rollers 504, 506, 508, 510, 511, and 512, one or more pins, such as pin 514, a carriage 515, a carriage attachment 516, a belt 518, a pulley 520, and a motor 522.

In some implementations, cover 502 can be any suitable cover and/or housing for pulley 520 and/or belt 518. Note that although cover 502 is shown as transparent in FIG. 5, in some implementations, cover 502 can be made of any suitable material (e.g., metal, plastic, and/or any other suitable material) with any suitable translucency.

Rollers 504, 506, 508, 510, and/or 512 can be any suitable rollers for contacting one or more pins 514, thereby causing a contacted pin to be displaced towards a key of a computer keyboard that is being tested, for example, as described above in connection with FIGS. 1 and 2. In some implementations, rollers 504, 506, 508, 510, and/or 512 can be coupled to carriage 515, as shown in FIG. 5. In some implementations, rollers 504, 506, 508, 510, and/or 512 can be displaced with respect to each other, as shown in FIG. 5. For example, in some implementations, rollers 504, 506, 508, 510, and/or 512 can be placed at different positions along one or more axes of carriage 515. Although six rollers are shown in FIG. 5, in some implementations, any suitable number of rollers can be included (e.g., one, two, six, and/or any other suitable number). For example, in some implementations, the number of rollers can correspond to a number of rows to be tested on a particular type of computer keyboard. As another example, in some implementations, any suitable number of rollers can be used to actuate all of the pins.

In some implementations, carriage 515 can be any suitable housing to which rollers 504, 506, 508, 510, 511, and/or 512 can be coupled using any suitable techniques. For example, in some implementations, the rollers can be attached to carriage 515 using one or more fasteners (e.g., e.g., a bracket, a screw, a bolt, a clip, a rivet, a nut, and/or any other suitable fastener). Carriage 515 can be made of any suitable material (e.g., metal, plastic, and/or any other suitable material) or combination of materials.

In some implementations, carriage 515 can be coupled to belt 518 via carriage attachment 516. For example, in some implementations, carriage attachment 516 can be coupled to carriage 515, and an additional coupling structure (e.g., one or more hooks, screws, and/or any other suitable structure(s)) can couple carriage attachment 516 to belt 518. In some implementations, carriage attachment 516 can include any suitable coupling element, such as one or more screws, and/or any other suitable elements. Additionally or alternatively, in some implementations, carriage 515 can be coupled to belt 518 using any suitable adhesives (e.g., glue, epoxy, and/or any other suitable adhesives).

Belt 518 can be any suitable structure that can move carriage 515 when belt 518 is moving. Belt 518 can be made of any suitable material (e.g., plastic, rubber, fabric, metal, and/or any other suitable material). In some implementations, belt 518 can be a closed loop that is capable of continuously rotating around pulley 520.

Pulley 520 can be any suitable pulley for causing belt 518 to move. As shown in FIG. 5, in some implementations, pulley 520 can have a circular cross-sectional area. Furthermore, in some implementations, belt 518 can be wrapped around pulley 520 such that rotation of pulley 520 around a central point causes belt 518 to move in the direction of rotation. Pulley 518 can be made of any suitable material and can have any suitable dimensions.

Motor 522 can be any suitable motor for causing pulley 520 to move and/or rotate. For example, in some implementations, motor 522 can be a servomotor whose position, velocity, and/or acceleration can be specified. In some such implementations, motor 522 can include one or more sensors for sensing and/or communicating feedback indicating a position and/or velocity. In some implementations, motor 522 can cause pulley 520 to rotate in a clockwise and/or counterclockwise direction. Motor 522 can be coupled to pulley 520 using any suitable coupling element (e.g., one or more screws, and/or any other suitable element(s)).

Figure 6:
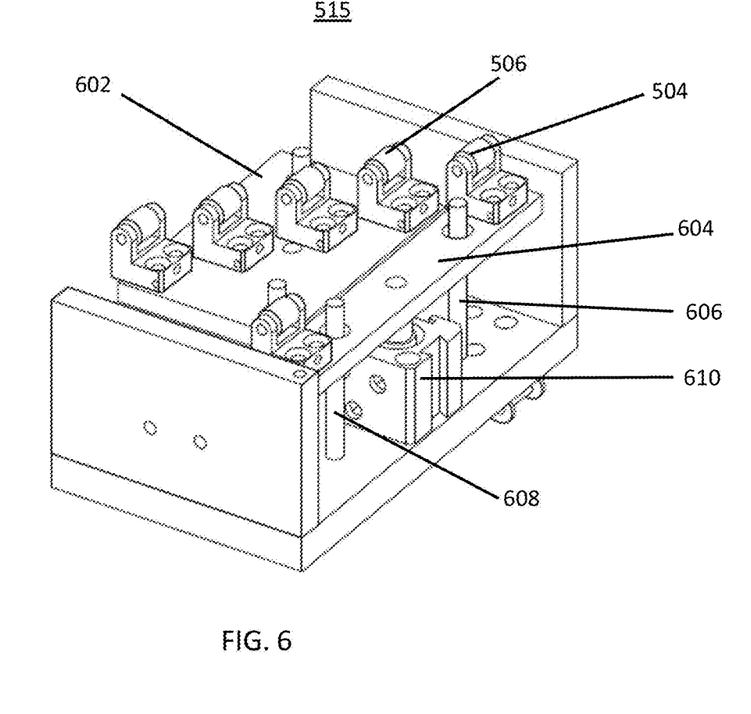
FIG. 6 shows a more detailed view of a carriage used in the automated testing system of FIGS. 3-5 in accordance with some implementations of the disclosed subject matter.

FIG. 6 shows a more detailed view of carriage 515 of FIG. 5 in accordance with some implementations of the disclosed subject matter. As illustrated, in some implementations, carriage 515 can include a first platform 602, a second platform 604, straight bearings 606 and 608, and a linear actuator 610.

As shown in FIG. 6, in some implementations, one or more rollers (e.g., roller 504) can be coupled to second platform 604, and one or more rollers (e.g., roller 506) can be coupled to first platform 602. In some implementations, linear actuator 610 can control a height of second platform 604, thereby causing rollers coupled to second platform 604 (e.g., roller 504) to contact pins aligned with the rollers. Additionally, in some implementations, linear actuator 610 can control a height at which the rollers coupled to second platform 604 contact the pins via control of the height of second platform 604. In some implementations, linear actuator 610 can cause second platform 604 to be lowered and/or retracted after carriage 515 has completed one sweep along a computer keyboard being tested. Additionally or alternatively, in some implementations, a second linear actuator (not shown) can control a height of first platform 602, thereby causing rollers coupled to first platform 602 (e.g., roller 506) to contact pins aligned with the rollers. Additionally, in some implementations, the second linear actuator can control a height at which the rollers coupled to first platform 602 contact the pins via control of the height of first platform 602. Carriage 515 can then complete a second sweep along the computer keyboard (e.g., in an opposite direction from the first sweep) with second platform 604 retracted (or first platform 602 raised), thereby causing rollers coupled to first platform 602 to contact aligned pins.

In some implementations, linear actuator 610 can be made of any suitable material and can include any suitable elements for causing second platform 604 to raise and/or retract. For example, in some implementations, linear actuator 610 can include a piston which can engage with second platform 604 to cause second platform 604 to be displaced toward or away from a computer keyboard being tested. As another example, in some implementations, a scissor lift with a platform that can engage second platform 604 can be used in lieu of linear actuator 610. In some such implementations, upward motion of the scissor lift can be actuated by application of pressure to an outer portion of the scissor lift, thereby causing linear actuator 610 to engage with second platform 604. In such implementations, contraction of the scissor lift (e.g., to cause second platform 604 to retract) can be initiated with any suitable hydraulic, pneumatic, and/or mechanical mechanism.

In some implementations, straight bearings 606 and/or 608 can be used to restrict motion in a direction perpendicular to a direction in which carriage 515 moves.

Figure 7:
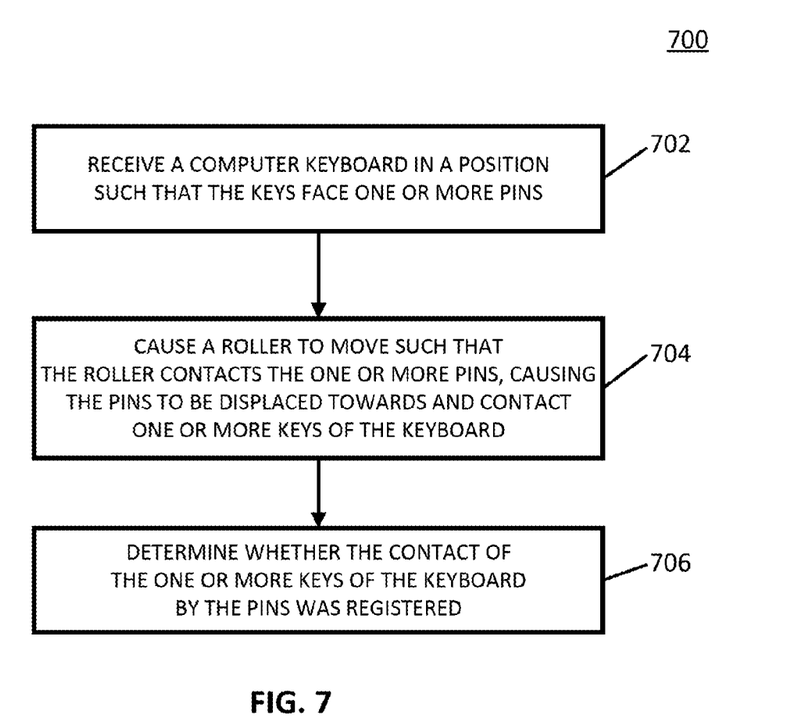
FIG. 7 shows an example of a process for testing a computer keyboard in accordance with some implementations of the disclosed subject matter.

Turning to FIG. 7, an example 700 of a process for testing a computer keyboard is shown in accordance with some implementations of the disclosed subject matter.

Process 700 can begin by receiving a computer keyboard to be tested in a position such that keys of the computer keyboard face one or more pins that are to contact the keys at 702. The computer keyboard can be received in any suitable orientation. For example, in some implementations, the computer keyboard can be placed such that the keys face down, and the pins that contact the keys during testing can be biased by the force of gravity, as shown, for example, in FIG. 1. As another example, in some implementations, the computer keyboard can be placed such that the keys face up, and the pins that contact the keys during testing can be biased by a spring that opposes the force of gravity, as shown, for example, in FIG. 2. As yet another example, in some implementations, the computer keyboard can be placed in a keyboard positioning structure within an apparatus that allows for automated testing of the computer keyboard, as shown, for example, in FIGS. 3 and 4. In some implementations, process 700 can determine that a computer keyboard has been received based on a signal from a sensor on an apparatus for testing a computer keyboard. For example, in some implementations, process 700 can use an output from a sensor that detects weight, acceleration, occlusion of a light sensor, a change in impedance, a change in capacitance, and/or any other suitable signal to determine that a computer keyboard has been placed in a correct orientation in an apparatus to which the sensor is coupled.

Process 700 can cause a roller to move such that the roller contacts the one or more pins, thereby causing the pins to be displaced towards and/or contact one or more keys of the computer keyboard at 704. Process 700 can cause the roller to move in any suitable manner. For example, in some implementations, process 700 can cause the roller to move when a handle coupled to the roller is moved, as described above in connection with FIG. 2. As another example, in some implementations, process 700 can cause the roller to move by causing a motor to rotate a pulley, which can cause a belt to move a carriage to which the rollers are coupled, as shown in and described above in connection with FIGS. 5 and 6. As a more particular example, in some implementations, process 700 can cause the motor to rotate the pulley in response to determining that one or more start buttons have been pressed, as described above in connection with FIG. 3.

Process 700 can determine whether the contact of one or more of the keys of the computer keyboard by the one or more pins was registered at 706 in any suitable manner. For example, in some implementations, the computer keyboard can be connected to a computer and/or monitor in any suitable manner (e.g., a Universal Serial Bus (USB) cable, and/or any other suitable connection). As a more particular example, keypresses from the computer keyboard which result from a pin contacting a key can be registered and/or recorded by the computer, and process 700 can determine which keypresses were registered. In some implementations, process 700 can output all registered keypresses. Additionally or alternatively, in some implementations, process 700 can output expected keypresses which were not registered. For example, in some implementations, process 700 can output indications of keys for which keypresses were not registered, thereby indicating that the corresponding key may be malfunctioning.

Figure 8:
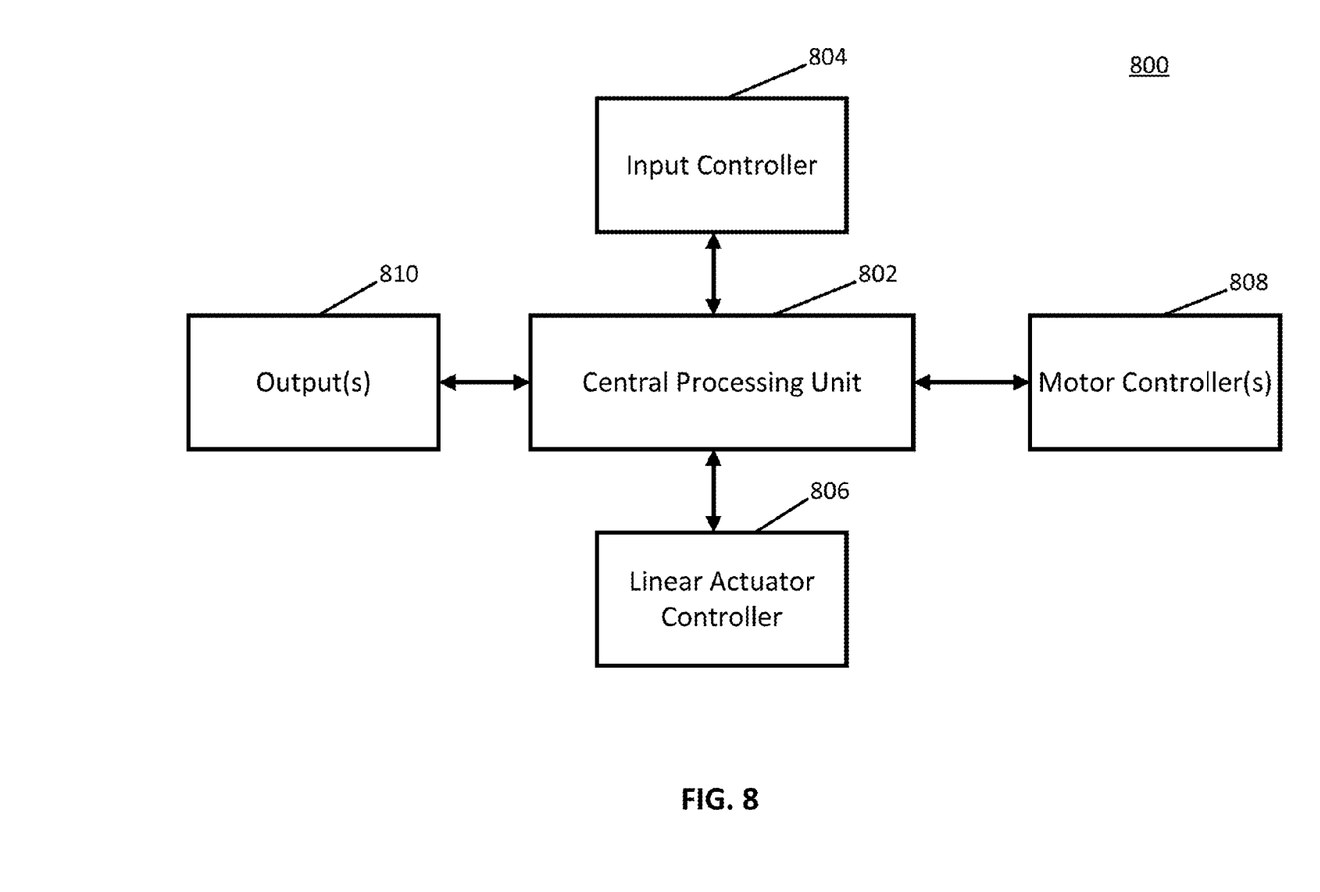
FIG. 8 shows a schematic diagram of an illustrative system suitable for implementation of mechanisms described herein used in the automated testing system of FIGS. 3-6 in accordance with some implementations of the disclosed subject matter.

Turning to FIG. 8, an example 800 of hardware for automated testing of computer keyboards (e.g., as described above in connection with FIGS. 3-6) in accordance with some implementations of the disclosed subject matter is shown. As illustrated, hardware 800 can include a central processing unit (CPU) 802, one or more input controllers 804, one or more linear actuator controller 806, motor controller 808, and one or more outputs 810.

In some implementations, CPU 802 can be any suitable hardware for allowing a computer to carry out instructions for automated testing of computer keyboards. CPU 802 can include any suitable hardware processor, such as a microprocessor, a micro-controller, digital signal processor(s), dedicated logic, and/or any other suitable circuitry for controlling the functioning of a general purpose computer or a special purpose computer in some implementations. In some implementations, the hardware processor(s) can be controlled by a computer program stored in memory. For example, in some implementations, the computer program can control a motor that causes a pulley to rotate, thereby moving a carriage housing one or more rollers that engage with one or more pins, as described above in connection with FIGS. 5 and 6. As a more particular example, in some implementations, the computer program can control the motor via communication with motor controller 808. As another example, in some implementations, the computer program can cause keypresses to be registered, as described above in connection with FIG. 7.

Although not shown in FIG. 8, in some implementations, CPU 802 can be associated with a memory that can be used to store data, programs, and/or any other suitable information. In some implementations, the memory can include random access memory, read-only memory, flash memory, hard disk storage, optical media, and/or any other suitable computer-readable medium.

Input controllers 804 can include any suitable circuitry for controlling and receiving input. For example, in some implementations, input controllers 802 can cause inputs from one or more start buttons to be received and/or recorded.

Linear actuator controller 806 can include any suitable circuitry for controlling one or more linear actuators, for example, linear actuator 610 that controls a height of second platform 604, as shown in and described above in connection with FIG. 6. In some implementations, linear actuator controller 806 can receive one or more input signals from CPU 802. For example, in some implementations, the one or more input signals can indicate a time at which a platform is to be retracted and/or raised.

Outputs 810 can include circuitry for controlling any suitable outputs. For example, in some implementations, outputs 810 include circuitry for controlling indicators 312, as shown in and described above in connection with FIG. 3. As another example, in some implementations, outputs 810 can include circuitry for registering and recording keypresses that resulted from a pin contacting a key of a computer keyboard being tested.

In some implementations, any suitable computer readable media can be used for storing instructions for performing the functions and/or processes herein. For example, in some implementations, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, systems for testing a computer keyboard are presented.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A system for testing a keyboard, the system comprising:
a plurality of elongate members;
a support structure that includes a plurality of apertures having an arrangement that corresponds to at least a portion of a plurality of keys of a computer keyboard; and
a roller that moves past a subset of apertures of the plurality of apertures during operation of the system and contacts at least one of the plurality of elongate members aligned with each of the subset of apertures.

2. The system of claim 1, wherein a longitudinal axis of each of the plurality of elongate members is aligned with a corresponding one of the plurality of apertures.

3. The system of claim 1, wherein the support structure further comprises a first surface and a second surface and wherein the plurality of apertures pass through the support structure from the first surface to the second surface.

4. The system of claim 3, wherein the elongate member has a first end and a second end and wherein the roller causes the elongate member to be displaced by at least a first amount that is based on the dimensions of the roller such that the second end of the elongate member protrudes at least a second amount from the second surface of the support structure.

5. The system of claim 4, wherein a cross-sectional area of the elongate member is larger than an area of the corresponding aperture at a point between the first end and the second end.

6. The system of claim 4, further comprising a supporting bar, wherein the supporting bar comprises a ledge along which the roller is configured to roll during operation.

7. The system of claim 6, further comprising a handle coupled to the roller, and wherein moving the handle causes the roller to roll along the supporting bar.

8. The system of claim 6, wherein a distance between the supporting bar and the first end of the plurality of elongate members is adjustable, thereby effecting a change in the second amount by which the second end of the elongate member protrudes.

9. The system of claim 1, wherein the arrangement of the support structure substantially corresponds to a layout of the plurality of keys of the computer keyboard.

10. The system of claim 1, wherein a bias is applied to the plurality of elongate members by gravity, and wherein the roller overcomes the gravitational bias to displace the elongate member by the first amount during operation of the system.

11. The system of claim 1, wherein a bias is applied to the plurality of elongate members by a plurality of springs each corresponding to one of the plurality of elongate members, and wherein the roller overcomes the bias provided by the springs to displace the elongate member by the first amount during operation of the system.

12. The system of claim 1, further comprising:
a carriage coupled to the roller;
a belt coupled to the carriage;
a pulley coupled to the belt; and
a motor that causes the pulley to rotate during operation of the system, thereby causing the belt to move the carriage to contact a subset of the plurality of elongate members.

13. The system of claim 12, wherein the carriage comprises a first platform and a second platform, wherein the first platform is coupled to the roller and the second platform is coupled to a second roller.

14. The system of claim 13, further comprising a linear actuator coupled to the first platform, wherein the linear actuator controls a distance between the roller and the first end of the plurality of elongate members.

15. The system of claim 14, further comprising a second linear actuator coupled to the second platform, wherein the linear actuator coupled to the first platform causes the distance between the roller and the first end of the plurality of elongate members to be reduced during lateral movement of the carriage in a first direction, wherein the second linear actuator causes a distance between the second roller and the first end of the plurality of elongate members to be reduced during lateral movement of the carriage in a second direction, and wherein the linear actuator causes the distance between the roller and the first end of the plurality of elongate members to be increased during lateral movement of the carriage in the second direction.

16. The system of claim 1, further comprising a hardware processor that determines which of the plurality of keys of the computer keyboard, in response to being contacted by one or more of the plurality of elongate members, generated a signal that a key of the computer keyboard was pressed.

17. The system of claim 1, further comprising a sensor that provides a signal in response to detecting that the computer keyboard has been received.

18. The system of claim 17, wherein the sensor is further configured to determine that the computer keyboard has been placed in a particular orientation.

19. A system for testing a keyboard, the system comprising:
a plurality of contacting means;
guiding means that includes a plurality of arranging means having an arrangement that corresponds to at least a portion of a plurality of keys of a computer keyboard; and
displacing means that moves past a subset of the plurality of arranging means during operation of the system and contacts the contacting means aligned with each of the subset of arranging means.

20. A system for testing a keyboard, the system comprising:
a plurality of pins;
a plurality of apertures having an arrangement that corresponds to at least a portion of a plurality of keys of a keyboard; and
a roller that moves past a subset of apertures of the plurality of apertures during operation of the system and contacts at least one of the plurality of pins aligned with each of the subset of apertures.

* * * * *